United States Patent
Tomimatsu et al.

(10) Patent No.: US 8,584,653 B2
(45) Date of Patent: Nov. 19, 2013

(54) CONTROL DEVICE OF INTERNAL COMBUSTION ENGINE

(75) Inventors: Makoto Tomimatsu, Susono (JP); Koichi Hoshi, Susono (JP); Shogo Suda, Toyota (JP)

(73) Assignee: Toyota Jidosha Kabushiki Kaisha, Toyata (JP)

( * ) Notice: Subject to any disclaimer, the term of this patent is extended or adjusted under 35 U.S.C. 154(b) by 320 days.

(21) Appl. No.: 13/123,634

(22) PCT Filed: Oct. 20, 2008

(86) PCT No.: PCT/JP2008/069383
§ 371 (c)(1),
(2), (4) Date: Apr. 11, 2011

(87) PCT Pub. No.: WO2010/046999
PCT Pub. Date: Apr. 29, 2010

(65) Prior Publication Data
US 2011/0192380 A1 Aug. 11, 2011

(51) Int. Cl.
*F02D 13/04* (2006.01)
(52) U.S. Cl.
USPC .... 123/493; 123/322; 123/90.15; 123/406.25
(58) Field of Classification Search
USPC .................. 701/103–105, 110; 123/320–323, 123/345–348, 406.23–406.25, 406.5, 436, 123/493, 90.15, 568.11, 568.14
See application file for complete search history.

(56) References Cited

U.S. PATENT DOCUMENTS

| | | |
|---|---|---|
| 2001/0050067 A1 | 12/2001 | Sato |
| 2003/0070637 A1 | 4/2003 | Majima |

FOREIGN PATENT DOCUMENTS

| | | |
|---|---|---|
| JP | A-2001-152854 | 6/2001 |
| JP | A-2001-280228 | 10/2001 |
| JP | A-2001-355462 | 12/2001 |
| JP | A-2002-89302 | 3/2002 |
| JP | A-2003-120348 | 4/2003 |
| JP | A-2006-348758 | 12/2006 |
| JP | A-2007-40310 | 2/2007 |
| JP | A-2007-107440 | 4/2007 |

OTHER PUBLICATIONS

International Search Report mailed Dec. 9, 2008 issued in International Patent Application No. PCT/JP2008/069383 (with translation).

*Primary Examiner* — Hai Huynh
(74) *Attorney, Agent, or Firm* — Oliff & Berridge, PLC

(57) ABSTRACT

An internal combustion engine is provided with a fuel injector which injects fuel into an intake port and exhaust variable valve timing mechanism which changes a valve timing of an exhaust valve. A control device executes early exhaust valve closing control which advances a closing timing of an exhaust valve when conditions for executing early exhaust valve closing control stand. The control device detects an output torque output by an engine body. At the time of deceleration of the engine, even when the condition for executing early exhaust valve closing control stands, execution of early exhaust valve closing control is prohibited when it is predicted that the output torque will become smaller than the limit torque. Thus, due to execution of the early exhaust valve closing control, a large torque fluctuation is prevented from occurring at the time of deceleration of the engine.

9 Claims, 6 Drawing Sheets

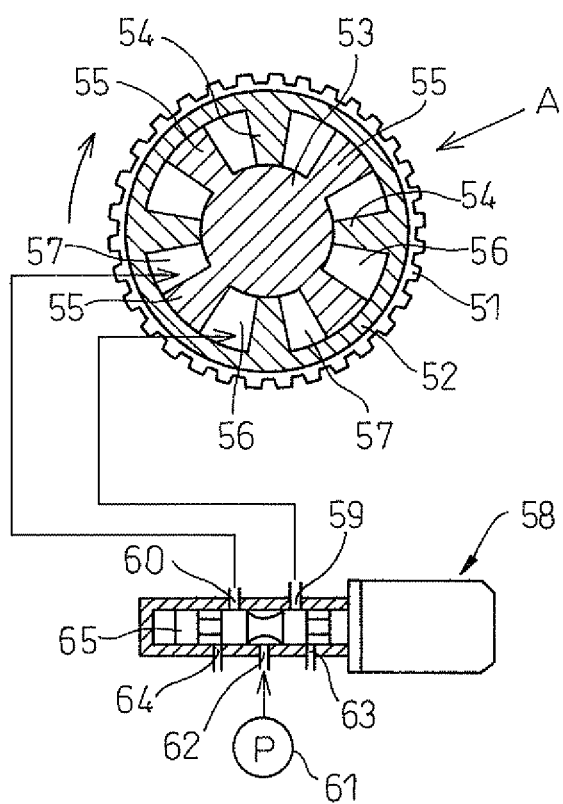

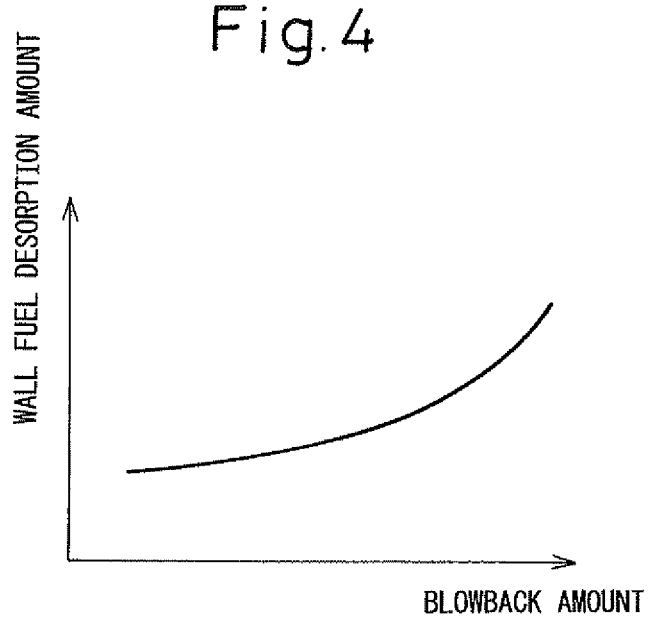

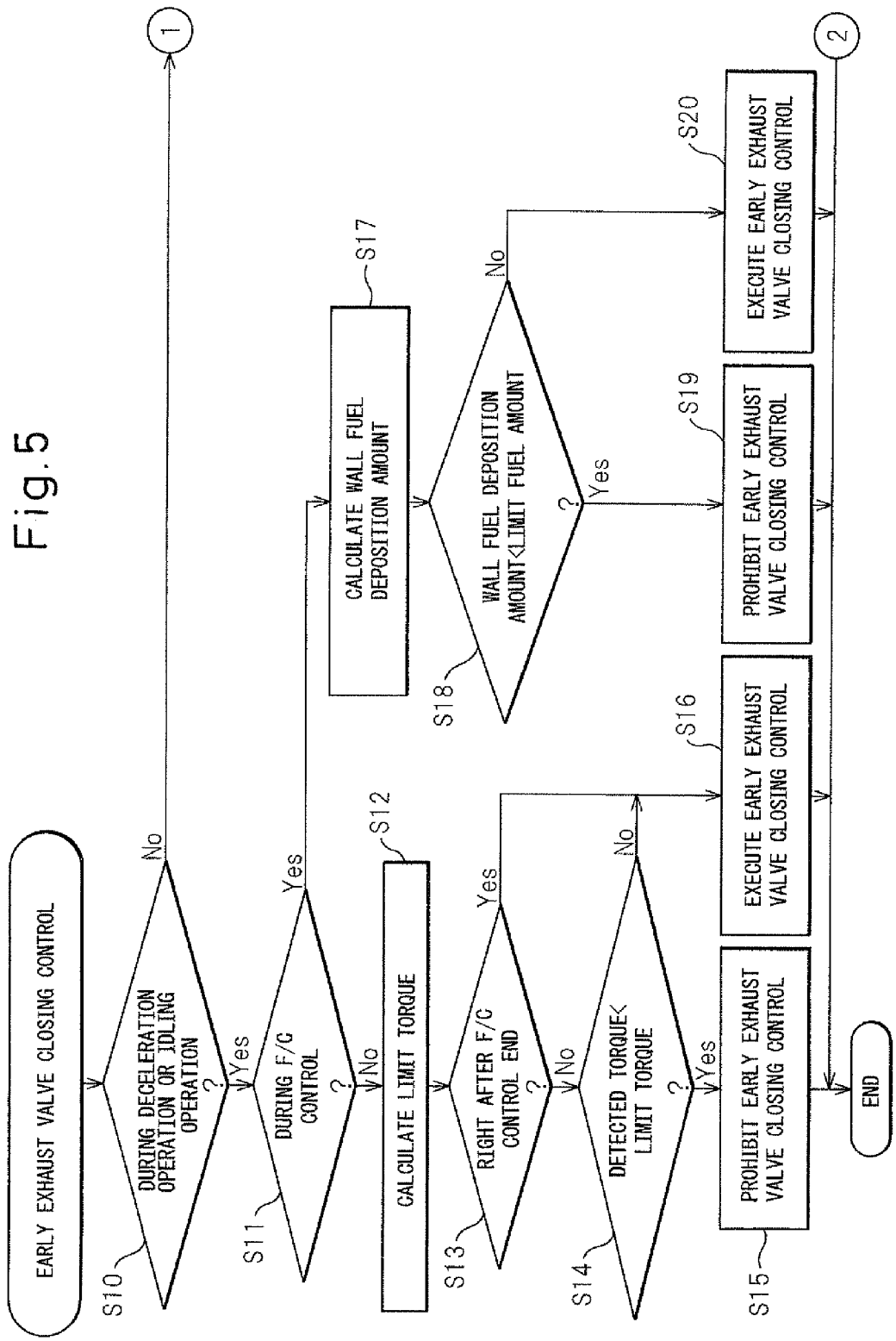

CONTROL DEVICE OF INTERNAL COMBUSTION ENGINE

TECHNICAL FIELD

The present invention relates to a control device of an internal combustion engine.

BACKGROUND ART

In the past, an internal combustion engine which has an exhaust variable valve timing mechanism which can change the phase angle (valve timing) of an exhaust valve has been known. In this internal combustion engine, for example, at the time of cold start of the internal combustion engine, control is performed for advancing the closing timing of the exhaust valve with respect to intake top dead center for the purpose of decreasing the emission of unburned hydrocarbons (unburned HC) from the engine body (for example, Japanese Patent Publication (A) No. 2003-120348).

That is, at the time of engine startup, not all of the fuel which is injected from a fuel injector is burned. Part of the fuel remains as unburned HC in the combustion gas. Here, in the system described in Japanese Patent Publication (A) No. 2003-120348, when in a state where combustion gas cannot be sufficiently again sucked into a combustion chamber due to the relationship of the pressure inside the intake passage and the pressure inside the exhaust passage, the closing timing of the exhaust valve is advanced. Due to this, even after the exhaust valve closing, a large amount of combustion gas remains in the combustion chamber. This combustion gas is sucked into the combustion chamber in the intake stroke of the next cycle. For this reason, a large amount of combustion gas is again taken into the combustion chamber. Accordingly, the unburned HC contained in this combustion gas will be burned in the next cycle. Due to this, it is possible to decrease the unburned HC contained in the exhaust gas.

In this regard, as control performed in an internal combustion engine which has an exhaust variable valve timing mechanism able to change the operating angle of an exhaust valve, there are various control routines other than the control described in the above Japanese Patent Publication (A) No. 2003-120348. As one of such control routines, an early exhaust valve closing control at the time of engine low load operation etc. may be mentioned.

In this early exhaust valve closing control, at the time of engine low load operation etc., the closing timing of the exhaust valve is advanced compared with the ordinary time and is at the advanced side from intake top dead center. Due to this, the exhaust valve is closed before the piston reaches top dead center. For this reason, the piston rises after exhaust valve closing, whereupon the combustion gas remaining inside the combustion chamber is compressed. Therefore, at the time of opening of the intake valve, the pressure of the exhaust gas inside the combustion chamber becomes high and at least part of the exhaust gas inside the combustion chamber flows back into the intake port. Due to such backflow of the exhaust gas, the fuel which was deposited on the wall of the intake port can be blown off, the atomization of the fuel which was injected from the fuel injector can be promoted, and the combustion state of the internal combustion engine can be improved.

In this regard, when the exhaust variable valve timing mechanism cannot change the operating angle (i.e., the opening time) of the exhaust valve, a drop in the indicated thermal efficiency of the internal combustion engine is invited. That is, when it is not possible to change the operating angle of the exhaust valve, advance of the closing timing of the exhaust valve leads to advance of the opening timing of the exhaust valve. If the opening timing of the exhaust valve is advanced at the advanced side of the expansion bottom dead center, the period during which the combustion gas causes the piston to be pushed down becomes shorter. As a result, the energy of the combustion gas can no longer be sufficiently converted to kinetic energy of the piston and a drop in the output torque from the internal combustion engine is invited. In particular, the effect becomes remarkable at the time of a deceleration operation of the internal combustion engine. Torque shock occurs due to the rapid drop of the output torque or the output torque falls too much and engine stalling is invited in some cases.

SUMMARY OF INVENTION

The present invention was made in consideration of the above problem and its object is to provide a control device of an internal combustion engine which executes early exhaust valve closing control to prevent occurrence of a torque fluctuation which would invite a deterioration of the drivability or engine stalling at the time of a deceleration operation of the internal combustion engine etc.

The present invention provides, as means for solving the problem, a control device of an internal combustion engine as set forth in the claims.

In a first aspect of the present invention, there is provided a control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens, wherein the control device is further provided with a torque detecting means for detecting an output torque which is output by an engine body and, wherein at the time of a deceleration operation of the internal combustion engine, even when the condition for executing early exhaust valve closing control stands, execution of the early exhaust valve closing control is prohibited when the output torque which is detected by the torque detecting means is predicted as becoming smaller than a limit torque.

According to the present aspect, if the output torque of the internal combustion engine is predicted as becoming too small, execution of the early exhaust valve closing control is prohibited. Due to this, at the time of a deceleration operation of the internal combustion engine, by performing early exhaust valve closing control when the output torque of the internal combustion engine is sufficient, it is possible to make the state of combustion of the internal combustion engine a good state, while by prohibiting early exhaust valve closing control when the output torque of the internal combustion engine is not sufficient, it is possible to prevent the occurrence of a torque fluctuation which would invite deterioration of drivability and engine stalling.

Note that, "limit torque" means the lowest torque necessary for maintaining the operation of the internal combustion engine or the lowest torque necessary for preventing rapid torque fluctuation compared with the output torque of several cycles before the current cycle.

In a second aspect of the present invention, there is provided a control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens, wherein the control device is further provided with a torque detecting means for detecting an output torque which is output by an engine body and, wherein at the time of a deceleration operation of the internal combustion engine, even when the condition for executing early exhaust valve closing control stands, the ignition timing is advanced when the output torque which is detected by the torque detecting means is predicted as becoming smaller than a limit torque.

According to the present aspect, if the output torque of the internal combustion engine is predicted as becoming too small, the ignition timing is advanced. Due to this, at the time of a deceleration operation of the internal combustion engine, by performing the early exhaust valve closing control when the output torque of the internal combustion engine is sufficient, it is possible to make the state of combustion of the internal combustion engine a good state, while by making the ignition timing advance when the output torque of the internal combustion engine is not sufficient, it is possible to prevent the occurrence of a torque fluctuation which would invite deterioration of drivability and engine stalling.

In a third aspect of the present invention, there is provided a control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens, wherein, at the time of a deceleration operation of the internal combustion engine, even when the condition for executing early exhaust valve closing control stands, execution of the early exhaust valve closing control is prohibited when the engine speed is predicted as becoming lower than a limit speed.

Note that, "limit speed" means the lowest engine speed necessary for maintaining the operation of the internal combustion engine or the lowest engine speed necessary for preventing rapid torque fluctuation compared with the engine speed of several cycles before the current cycle.

In a fourth aspect of the present invention, there is provided a control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens, wherein, at the time of a deceleration operation of the internal combustion engine, even when the condition for executing early exhaust valve closing control stands, the ignition timing is advanced when the engine speed is predicted as becoming lower than a limit speed.

In a fifth aspect of the present invention, during fuel cut control which stops fuel injection from the fuel injector, even when the condition for executing early exhaust valve closing control stands, the execution of the early exhaust valve closing control is prohibited regardless of the output torque and engine speed when the wall fuel deposition amount stuck to the intake port wall is smaller than a limit fuel amount.

Note that, "limit fuel amount" means the wall fuel deposition amount where, if the wall fuel deposition amount were to become less than that, it would no longer be possible to quickly make the air-fuel ratio of the air-fuel mixture the target air-fuel ratio after the end of fuel cut control.

In a sixth aspect of the present invention, during fuel cut control which stops fuel injection from the fuel injector, the amount of advance of the closing timing of the exhaust valve in the early exhaust valve closing control is controlled in accordance with the wall fuel deposition amount which is stuck to the intake port wall.

In a seventh aspect of the present invention, the wall fuel deposition amount is estimated based on the combustion state of the preceding cycle, the valve timings of the intake valve and exhaust valve, the pressure inside the intake passage, the amount of air passing through the intake port in the current cycle, and the fuel injection amount of the current cycle.

In an eighth aspect of the present invention, right after the end of fuel cut control, even if the condition for executing early exhaust valve closing control does not stand, the early exhaust valve closing control is executed.

In a ninth aspect of the present invention, when executing early exhaust valve closing control right after the end of fuel cut control, the amount of advance of the exhaust value in the early exhaust valve closing control is set in accordance with the wall fuel deposition amount at the time of end of the fuel cut control.

Below, the present invention will be understood more from the attached drawings and the description of the preferable embodiments of the present invention.

BRIEF DESCRIPTION OF DRAWINGS

FIG. 2 is a view showing an exhaust variable valve timing mechanism.

FIG. 4 is a view showing the relationship between an amount of blowback of combustion gas and an amount of fuel desorbed from a wall surface.

FIG. 5 is part of a flowchart showing a control routine of early exhaust valve closing control.

BEST MODE FOR CARRYING OUT INVENTION

Figure 1:
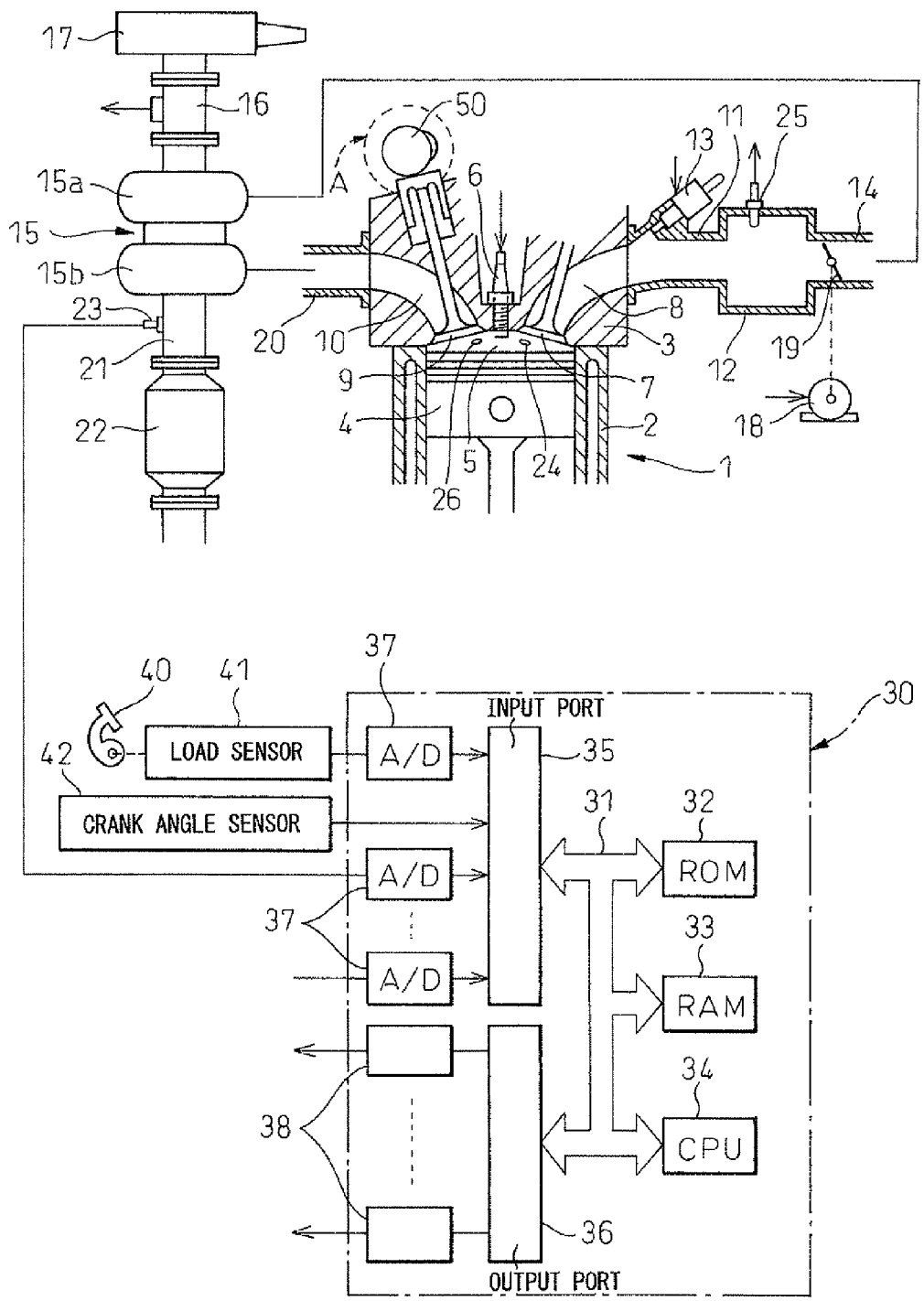
FIG. 1 is an overall view showing the internal combustion engine in which the control device of the present invention is used.

Below, an embodiment of the present invention will be explained in detail with reference to the drawings. Note that, in the drawings, the same or similar elements are assigned the common reference numerals. FIG. 1 is an overall view showing the internal combustion engine in which the control device of the present invention is used.

Referring to FIG. 1, an engine body 1 is provided with a cylinder block 2, cylinder head 3, pistons 4, combustion chambers 5, and spark plugs 6 arranged at the centers of the tops of the combustion chambers 5, intake valves 7, intake ports 8, exhaust valves 9, and exhaust ports 10. Each intake port 8 is connected through an intake branch pipe 11 to a surge tank 12. Each intake branch pipe 11 is provided with fuel injector 13 to inject fuel toward the inside of the corresponding intake port 8. Each exhaust valve 9 is provided with an exhaust variable valve timing mechanism A able to control a phase angle of the exhaust valve 9 (that is, valve timing). Note that, in the present embodiment, only the exhaust valve 9 is provided with a variable valve timing mechanism, but not only the exhaust valve 9, but also the intake valve 7 may be provided with such a variable valve timing mechanism.

The surge tank 12 is connected through an intake duct 14 to an outlet of a compressor 15a of an exhaust turbocharger 15. The inlet of the compressor 15a is connected through an intake air detector 16 using for example a hot wire, to an air cleaner 17. Inside the intake duct 14, a throttle valve 19 which is driven by an actuator 18 is arranged.

On the other hand, each exhaust port 10 is connected through an exhaust manifold 20 to an inlet of an exhaust turbine 15b of the exhaust turbocharger 15. An outlet of the exhaust turbine 15b is connected through an exhaust pipe 21 to a catalytic converter 22 housing for example a three-way catalyst. Inside the exhaust pipe 21, an air-fuel ratio sensor 23 is arranged.

An electronic control unit 30 is comprised of a digital computer which is provided with components connected with each other by a bidirectional bus 31 such as a ROM (read only memory) 32, RAM (random access memory) 33, CPU (microprocessor) 34, input port 35, and output port 36. An output signal of the intake air detector 16 and an output signal of the air-fuel ratio sensor 23 are input through respectively corresponding AD converters 37 to the input port 35. At the top face of each combustion chamber 5, a pressure sensor 26 for detecting the pressure in the combustion chamber 5 and a temperature sensor 24 for detecting a gas temperature in the combustion chamber 5 are arranged. The output signals of these pressure sensor 26 and temperature sensor 24 are input through corresponding AD converters 37 to the input port 35. Further, inside the surge tank 12, that is, inside the intake passage downstream of the throttle valve 19, a pressure sensor 25 is arranged for detecting the pressure inside the intake passage. The output signal of this pressure sensor 25 is also input through the corresponding AD converter 37 to the input port 35.

Further, an accelerator pedal 40 is connected to a load sensor 41 which generates an output voltage proportional to the amount of depression of the accelerator pedal 40. The output voltage of the load sensor 41 is input through a corresponding AD converter 37 to the input port 35. Furthermore, the input port 35 is connected to a crank angle sensor 42 which generates an output pulse every time the crankshaft rotates by for example 30°. At the ECU 30, the output of this crank angle sensor 42 is used as the basis to calculate the engine speed. On the other hand, the output port 36 is connected through corresponding drive circuits 38 to the spark plugs 6, fuel injectors 13, throttle valve drive-use actuator 18, and exhaust variable valve timing mechanism A.

FIG. 2 shows an exhaust variable valve timing mechanism A which is attached to an end of a cam shaft 50 for driving each exhaust valve 9 in FIG. 1. Referring to FIG. 2, this exhaust variable valve timing mechanism A is provided with a timing pulley 51 which rotates by a crankshaft (not shown) of the engine body through a timing belt in the arrow direction, a cylindrical housing 52 which rotates together with the timing pulley 51, a rotation shaft 53 which can rotate together with an exhaust valve drive-use cam shaft 50 and can rotate relative to a cylindrical housing 52, a plurality of partition walls 54 which extend from the inner circumferential surface of the cylindrical housing 52 to the outer circumferential surface of the rotation shaft 53, and vanes 55 which extent between the partition walls 54 from the outer circumferential surface of the rotation shaft 53 to the inner circumferential surface of the cylindrical housing 52. At the two sides of each vane 55, an advance use hydraulic pressure chamber 56 and a retard use hydraulic pressure chamber 57 are formed.

Feeding of the working oil to the hydraulic pressure chambers 56 and 57 is controlled by a working oil feed control valve 58. This working oil feed control valve 58 is provided with hydraulic pressure ports 59 and 60 which are respectively connected to hydraulic pressure chambers 56 and 57, a feed port 62 of working oil which is discharged from a hydraulic pump 61, a pair of drain ports 63 and 64, and a spool valve 65 which controls connection and disconnection between the ports 59, 60, 62, 63, and 64.

When the phase of the cam of the exhaust valve drive-use cam shaft 50 should be advanced, at FIG. 2, the spool valve 65 is moved to the right, the working oil which is fed from the feed port 62 is fed through the hydraulic pressure port 59 to the advance use hydraulic pressure chamber 56, and the working oil in the retard use hydraulic pressure chamber 57 is exhausted from the drain port 64. At this time, the rotation shaft 53 rotates relative to the cylindrical housing 52 in the arrow direction.

As opposed to this, the phase of the cam of the exhaust valve drive-use cam shaft 50 should be retarded, at FIG. 2, the spool valve 65 is moved to the left, the working oil which is fed from the feed port 62 is fed through the hydraulic pressure port 60 to the retard use hydraulic pressure chamber 57, and the working oil in the advance use hydraulic pressure chamber 56 is exhausted from the drain port 63. At this time, the rotation shaft 53 rotates relative to the cylindrical housing 52 in the direction opposite to the arrow direction.

When the rotation shaft 53 rotates relative to the cylindrical housing 52, if the spool valve 65 is returned to the neutral position shown in FIG. 2, the relative rotational operation of the rotation shaft 53 is stopped and the rotation shaft 53 is held at the relative rotational position at that time. Therefore, the exhaust variable valve timing mechanism A can be used to make the phase of the cam of the exhaust valve drive-use cam shaft 50 advance and retard by the desired amount.

Figure 3A:
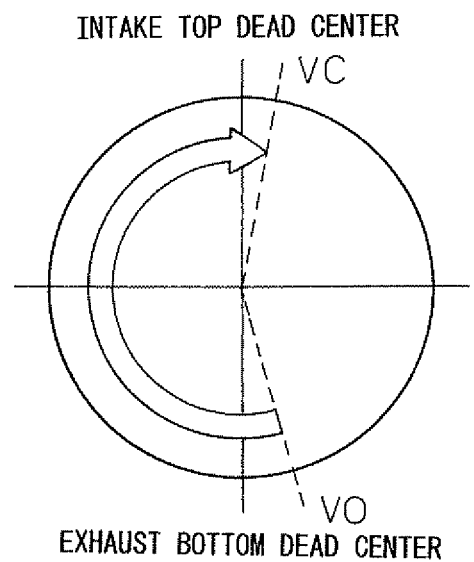
FIG. 3A and FIG. 3B are views showing the opening timing and closing timing of an exhaust valve.
Figure 3B:
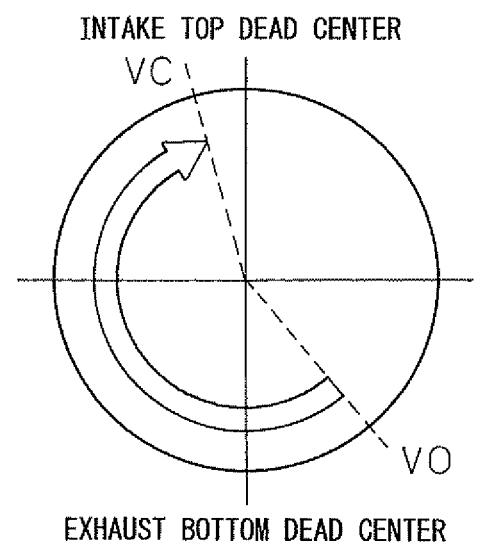

In the internal combustion engine of the present embodiment, at the time of engine low load operation, in particular, at the time of a deceleration operation and idling operation of the internal combustion engine, control is performed to make the closing timing of the exhaust valve 9 advance (hereinafter referred to as "early exhaust valve closing control"). That is, at the time of normal operation of the internal combustion engine, as shown in FIG. 3A, the exhaust valve 9 is opened at an opening timing VO slightly before exhaust bottom dead center and is closed at a closing timing VC slightly after intake top dead center. However, at the time of a deceleration operation and idling operation of the internal combustion engine, as shown in FIG. 3B, the exhaust valve 9 is opened at an opening timing VO considerably before exhaust bottom dead center and closed at a closing timing VC slightly before intake top dead center. Here, if referring to the opening timing VO and closing timing VC of the exhaust valve 9 with respect to the crank angle as the "phase angle" of the exhaust valve 9, in the internal combustion engine of the present embodiment, it can be said that the phase angle of the exhaust valve 9 is retarded at the time of engine low load operation compared with the time of normal operation.

As will be understood from FIG. 3B, if performing early exhaust valve closing control, the closing timing of the exhaust valve 9 is in the advanced side of intake top dead center. Therefore, the exhaust valve 9 closes before the piston 4 reaches top dead center. For this reason, if the piston 4 rises after closing of the exhaust valve 9, the combustion gas remaining inside the combustion chamber 5 is compressed.

Accordingly, at this time, the pressure of the combustion gas inside the combustion chamber 5 is higher than the pressure of the intake gas in the intake port 8. In this way, if the intake valve 7 is opened in the state with the pressure of the combustion gas in the combustion chamber 5 high, the combustion gas inside the combustion chamber 5 will be blown back into the intake port 8 and flow back.

On the other hand, in the internal combustion engine of the present embodiment, a fuel injector 13 is used to inject fuel toward the inside of the intake port 8. However, at the time of engine low load operation, the amount of air which passes through the intake port 8 is small, so the injected fuel will not be suitably atomized or part of the injected fuel will not be vaporized and will deposit on the wall surface of the intake port 8.

As opposed to this, if performing the above-mentioned early exhaust valve closing control, the combustion gas flows back to the inside of the intake port 8 at a relatively high pressure, so atomization of the injected fuel is promoted and the fuel which deposited on the wall surface of the intake port 8 is blown off by the combustion gas. Due to this, the injected fuel is atomized and vaporized well and then is sucked into the combustion chamber 5, so the internal combustion engine is improved in combustion state at the time of engine low load operation.

In this regard, when employing an exhaust variable valve timing mechanism A such as in the present embodiment, if making the closing timing VC of the exhaust valve 9 advance as shown in FIG. 3A and FIG. 3B, simultaneously the opening timing VO of the exhaust valve 9 is also advanced. For this reason, the exhaust valve 9 is opened considerably before the piston 4 reaches bottom dead center. Therefore, the exhaust valve 9 is opened in the middle of the piston 4 being pushed down by the combustion gas. For this reason, if the exhaust valve 9 opens early, the combustion energy obtained by combustion of the air-fuel mixture will no longer be able to be suitably converted to kinetic energy. Therefore, if performing early exhaust valve closing control, the output torque obtained by the internal combustion engine becomes smaller.

If the output torque becomes smaller by performing early exhaust valve closing control, depending on the engine operating state, the output torque of the internal combustion engine will rapidly drop, a large torque shock will occur, and deterioration of the drivability will be invited. Further, depending on the engine operating state, an output torque sufficient for maintaining the operation of the internal combustion engine cannot be obtained and stalling of the internal combustion engine (engine stalling) is invited.

Therefore, in this embodiment of the present invention, when the condition for executing early exhaust valve closing control stands, the internal combustion engine is controlled so as to prevent the occurrence of torque fluctuation which would invite deterioration of the drivability or engine stalling. Below, the control of the internal combustion engine in this embodiment of the present invention will be explained in detail.

In this embodiment of the present invention, as explained above, when the condition for executing early exhaust valve closing control stands, for example, during engine low load operation where the engine load is a predetermined load or less or during deceleration operation or idling operation of the internal combustion engine, early exhaust valve closing control is executed. However, during deceleration operation of the internal combustion engine, even when the condition for executing early exhaust valve closing control stands, execution of early exhaust valve closing control is prohibited when the output torque of the internal combustion engine is lower than the limit torque or is predicted as becoming lower than the limit torque.

Here, the "limit torque" means the lowest torque necessary for maintaining the operation of the internal combustion engine or the lowest torque necessary for preventing rapid torque fluctuation compared with the output torque of several cycles before the current cycle. This limit torque is, for example, calculated based on the output torque of the internal combustion engine up to the previous cycle as well as the engine speed, engine load, and other various types of parameters expressing the operating state of the internal combustion engine.

For example, the lowest torque required for maintaining the operation of the internal combustion engine becomes a value lower, the higher the engine speed. This is because if the engine speed is high, even if the output torque is small and the engine speed falls, the internal combustion engine will not easily stall. Further, the lowest torque required for preventing the occurrence of rapid torque fluctuation changes depending on the output torque up to the previous cycle and becomes larger, the larger the output torque up to the previous cycle. For example, the difference between the output torque up to the previous cycle and the lowest torque becomes substantially constant.

Further, the case where it is predicted that the torque will become lower than the limit torque means the case where the torque has not actually reached the limit torque, but may become lower than the limit torque, for example, the case where the actual output torque becomes less than a torque slightly higher than the limit torque.

As explained above, according to the internal combustion engine of the present embodiment, in principle, at the time of low load operation of the internal combustion engine, due to early exhaust valve closing control, deposition of fuel at the intake port and atomization of the injected fuel from the fuel injector 13 are promoted. In addition, by prohibiting early exhaust valve closing control under certain conditions, occurrence of a large torque shock or stalling of the internal combustion engine is prevented. Therefore, according to the present embodiment, combustion of the internal combustion engine can be maintained as good as possible while preventing the occurrence of unsuitable torque fluctuation.

Note that, in the above embodiment, when the output torque of the internal combustion engine is lower than the limit torque or when it is predicted to become lower than the limit torque, execution of the early exhaust valve closing control is prohibited. However, the condition for prohibition of execution of the early exhaust valve closing control is not limited to the above condition. For example, it is also possible to prohibit execution of the early exhaust valve closing control when the engine speed is lower than the limit speed or when it is predicted as becoming lower than the limit speed.

In this case, the "limit speed" means the lowest engine speed necessary for maintaining the operation of the internal combustion engine or the lowest engine speed necessary for preventing rapid torque fluctuation compared with the engine speed of several cycles before the current cycle. This limit speed is, for example, calculated based on the engine speed up to the previous cycle as well as the output torque, engine load, and other various types of parameters expressing the operating state of the internal combustion engine. Even when making the condition for prohibiting execution of the early exhaust valve closing control this condition, it is possible to prevent the occurrence of unsuitable torque fluctuation in the same way as the above embodiment.

In this regard, in the middle of deceleration operation of the internal combustion engine, in accordance with the engine load etc., fuel cut control, in which the injection of fuel from a fuel injector 13 is stopped, is performed. During this fuel cut control, basically no torque will be generated, and therefore as explained above, no torque shock will occur. Further, when the internal combustion engine is liable to stall, the fuel cut control is suspended, so during fuel cut control, the internal combustion engine will never stall. For this reason, during execution of fuel cut control, basically no unsuitable torque fluctuation will occur due to execution of early exhaust valve closing control. Therefore, in the present embodiment, even during deceleration operation of the internal combustion engine, during fuel cut control, basically early exhaust valve closing control is executed.

However, if early exhaust valve closing control is executed during fuel cut control, after the end of fuel cut control, sometimes the air-fuel ratio of the air-fuel mixture sucked into the combustion chamber 5 will not be able to be made the suitable air-fuel ratio.

That is, when not executing fuel cut control, even if executing early exhaust valve closing control, part of the fuel which is injected from a fuel injector 13 will deposit on the wall surface of the intake port 8. The fuel which is deposited on the wall surface of the intake port 8 in this way will in the following cycle be blown off by the air which flows from the surge tank 12 or the combustion gas which flows back from the combustion chamber 5. By repetition of such cycle, a certain amount of fuel will always be deposited on the wall surface of the intake port 8. Further, the fuel which is injected from the fuel injector 13 is set considering the fuel which is blown off from the wall surface of the intake port 8 so that the air-fuel ratio of the air-fuel mixture becomes the target air-fuel ratio (for example, stoichiometric air-fuel ratio).

In this regard, during fuel cut control, fuel is not injected from the fuel injector 13, so fuel will not newly deposit on the wall surface of the intake port 8. On the other hand, the fuel which deposited on the wall surface of the intake port 8 before the fuel cut control is blown off by the air which flows from the surge tank 12 and, when executing early exhaust valve closing control, is further blown off by the combustion gas which flows back from the combustion chamber 5. In this way, if new fuel is not deposited on the wall surface of the intake port 8 and only the already deposited fuel is blown off, in the end all of the fuel which was deposited on the wall surface of the intake port 8 will be blown off.

In this way, if the fuel cut control ends in the state where all of the fuel which had been deposited on the wall surface of the intake port 8 is blown off, the air-fuel ratio of the air-fuel mixture will no longer be able to be suitably controlled, since the fuel which is injected from the fuel injector 13 is set considering the fuel which is blown off from the wall surface of the intake port 8 and since the amount of fuel, in the injected fuel, which deposits on the wall surface of the intake port 8 increases. In particular, at the end of fuel cut control, the three-way catalyst in the catalytic converter 22 stores a large amount of oxygen, and therefore to restore the oxygen storage ability of the three-way catalyst, it is necessary to make the air-fuel ratio of the exhaust gas which is exhausted from the engine body 1 as rich as possible. However, the air-fuel ratio of the exhaust gas is hard to make rich due to the lack of fuel blown off from the wall surface of the intake port 8.

Therefore, in this embodiment of the present invention, during execution of fuel cut control, the amount of fuel which is deposited on the wall surface of the intake port 8 (below, referred to as the "wall fuel deposition amount") is estimated and the estimated wall fuel deposition amount is used as the basis to adjust execution of the early exhaust valve closing control. Specifically, in the present embodiment, when the estimated wall fuel deposition amount becomes smaller than a predetermined limit fuel amount, early exhaust valve closing control is prohibited without regard to the output torque of the internal combustion engine, engine speed, and other parameters. Here, the "limit fuel amount" means the wall fuel deposition amount where, if the wall fuel deposition amount were to become less than that, it would no longer be possible to quickly make the air-fuel ratio of the air-fuel mixture the target air-fuel ratio after the end of fuel cut control.

By prohibiting early exhaust valve closing control when the wall fuel deposition amount becomes smaller during execution of fuel cut control in this way, the fuel which is deposited on the wall surface of the intake port 8 will no longer be blown off by the combustion gas which flows back from the combustion chamber 5. Due to this, during execution of fuel cut control, some fuel remains deposited on the wall surface of the intake port 8. Therefore, even after the end of fuel cut control, it is possible to control the air-fuel ratio of the air-fuel mixture relatively well.

Alternatively, it is also possible to adjust the amount of advance of the exhaust valve 9 in early exhaust valve closing control in accordance with the wall fuel deposition amount which is estimated during fuel cut control. In this case, the smaller the wall fuel deposition amount, the smaller the retardation of the exhaust valve 9. Due to this, as the wall fuel deposition amount becomes smaller, the fuel which is deposited on the wall surface of the intake port 8 becomes harder to blow off by combustion gas which flows back from the combustion chamber 5. For this reason, during execution of fuel cut control, some fuel remains deposited on the wall surface of the intake port 8.

Next, the method of estimation of the wall fuel deposition amount will be explained. In the present embodiment, as explained later, the amount of blowback of the combustion gas in the current cycle and the intake air amount and fuel injection amount in the current cycle are used as the basis to estimate the wall fuel deposition amount in the current cycle.

First, in the present embodiment, the cylinder air filling amount in the previous cycle (amount of air which is filled in the combustion chamber 5) is detected by the intake air detector 16, and the fuel injection amount and ignition timing are detected. Based on these parameters, the combustion state (in particular, the cylinder temperature and cylinder pressure) of the air-fuel mixture in the combustion chamber 5 in the previous cycle can be estimated. By estimating the combustion state of the air-fuel mixture in the combustion chamber 5 in the previous cycle in this way, it is possible to estimate the amount of combustion gas which remains in the combustion chamber 5 at each point of time in the expansion stroke. Note that, the combustion state of the air-fuel mixture in the previous cycle, as shown in FIG. 1, may be directly detected by the pressure sensor 26 and temperature sensor 24 provided on the top surface of the combustion chamber 5.

Next, the closing timing of the exhaust valve 9 and the opening timing of the intake valve 7 at the current cycle are detected and, further, the pressure inside the intake passage is detected by the pressure sensor 25 in the intake passage. Due to this, it is possible to estimate the amount of combustion gas in the combustion chamber 5 at the time of closing of the exhaust valve 9 based on the combustion state of the air-fuel mixture in the combustion chamber 5 in the previous cycle and closing timing of the exhaust valve 9 and, further, it is possible to estimate the pressure of the combustion gas in the combustion chamber 5 at the time of opening of the intake valve 7 from the opening timing of the intake valve 7. Furthermore, it is possible to estimate the amount of blowback of combustion gas based on the pressure inside the intake passage, in particular the pressure in the intake port 8, at the time of opening of the intake valve 7, and the pressure of the combustion gas in the combustion chamber 5 at the time of opening of the intake valve 7.

The relationship between the amount of blowback of the combustion gas and the amount of fuel, in the fuel which is deposited on the wall surface of the intake port 8, which is desorbed from the wall surface of the intake port 8 due to blowback of the combustion gas (hereinafter referred to as the "wall fuel desorption amount") becomes a relationship such as shown in FIG. 4. Therefore, it is possible to estimate the wall fuel desorption amount accompanying blowback of the combustion gas, based on the combustion state of the air-fuel mixture at the previous cycle, the closing timing of the exhaust valve 9, the opening timing of the intake valve 7, and the pressure inside the intake passage.

Furthermore, in the present embodiment, the amount of air passing through the intake port 8 in the current cycle is detected by the intake air detector 16, the temperature of the engine cooling water is detected by a water temperature sensor (not shown), and the fuel injection amount in the current cycle is detected. Based on the amount of fuel injection in the current cycle, the amount of air passing through the intake port 8, and the engine cooling water temperature, the amount of fuel which is deposited on the wall surface of the intake port 8 in the fuel injected from the fuel injector 13 is detected. Based on the amount of air passing through the intake port 8, the wall fuel desorption amount accompanying the intake of air can be estimated.

Due to the above, according to the present embodiment, it is possible to estimate the wall fuel desorption amount accompanying blowback of combustion gas, the amount of fuel which is deposited on the wall surface of the intake port 8 accompanying fuel injection, and the wall fuel desorption amount accompanying intake of air. Therefore, it is possible to estimate the amount of change of the amount of fuel which is deposited on the wall surface of the intake port 8 in the current cycle. Further, by repeating this calculation, it is possible to estimate the wall fuel deposition amount at each cycle.

Figure 6:
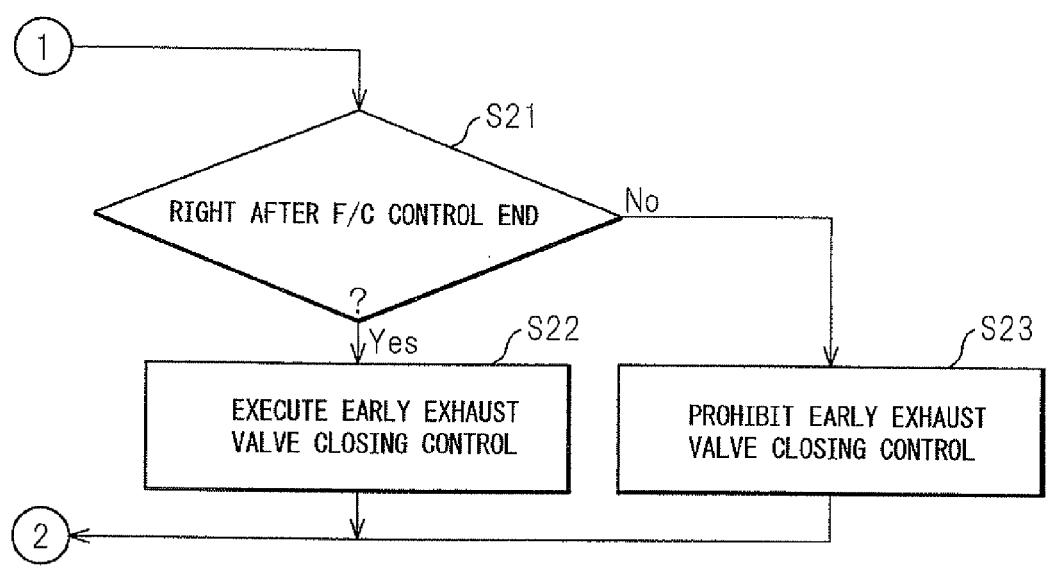
FIG. 6 is part of a flowchart showing a control routine of early exhaust valve closing control.

FIG. 5 and FIG. 6 are flowcharts showing the control routine in early exhaust valve closing control by the control device of the present embodiment. The illustrated control routine is performed by interruption at predetermined intervals.

In the control routine shown in FIG. 5 and FIG. 6, first, at step S10, it is determined if the engine operating state is the deceleration operation state or idling operation state. When it is determined at step S10 that the state is during deceleration operation or idling operation, the routine proceeds to step S11. At step S11, it is determined if the state is during fuel cut control (F/C control). When it is determined at step S11 that it is during fuel cut control, that is, during deceleration operation or during idling operation, not during execution of fuel cut control, the routine proceeds to step S12. At step S12, in addition to the output torque of the internal combustion engine up to the previous cycle, the engine speed, engine load, and other various types of parameters showing the operating state of the internal combustion engine are used as the basis to calculate the limit torque. Next, at steps S13 and S14, it is determined if the state is right after the end of fuel cut control and if the output torque (detected torque) which is detected by a torque sensor (not shown) is smaller than the limit torque. When it is determined at steps S13 and S14 that the state is not right after the end of fuel cut control and the detected torque is smaller than the limit torque, the routine proceeds to step S15 where early exhaust valve closing control is prohibited. On the other hand, when it is determined at steps S13 and S14 that the state is right after the end of fuel cut control or the detected torque is the limit torque or more, the routine proceeds to step S16 where early exhaust valve closing control is executed.

On the other hand, when it is determined at step S11 that the state is during fuel cut control, that is, when it is determined that the state is during deceleration operation or during idling operation and is during execution of fuel cut control, the routine proceeds to step S17. At step S17, a method as stated above is used to calculate the wall fuel deposition amount on the intake port 8. Next, at step S18, it is determined if the wall fuel deposition amount calculated at step S17 is smaller than the limit fuel amount. When it is determined at step S18 that the wall fuel deposition amount is smaller than the limit fuel amount, the routine proceeds to step S19 where the early exhaust valve closing control is prohibited. On the other hand, when it is determined at step S18 that the wall fuel deposition amount is the limit fuel amount or more, the routine proceeds to step S20 where the early exhaust valve closing control is executed.

On the other hand, if it is determined at step S10 that the engine operating state is not a deceleration operation or idling operation, the routine proceeds to step S21. At step S21, it is determined if the state is right after the end of fuel cut control. Here, "right after the end of fuel cut control" means, for example, after the end of fuel cut control when a predetermined constant time predicted as being necessary for the wall fuel deposition amount to return to the usual amount has not yet elapsed. When it is determined at step S21 that the state is right after the end of fuel cut control, that is, when it is determined that the state is not during deceleration operation or during idling operation, but is right after the end of fuel cut control, the routine proceeds to step S22 where early exhaust valve closing control is executed. On the other hand, when it is determined at step S21 that the state is not right after the end of fuel cut control, that is, when it is determined that the state is not during deceleration operation or during idling operation and not right after the end of fuel cut control, the routine proceeds to step S23 where early exhaust valve closing control is prohibited and the control routine is made to end.

Next, a control device of a second embodiment of the present invention will be explained. The control device of the second embodiment is basically similar to the first embodiment in constitution and control. However, in the control device of the second embodiment, during deceleration operation of the internal combustion engine, when the condition for executing early exhaust valve closing control stands, if the output torque of the internal combustion engine is lower than the limit torque, rather than prohibit the execution of early exhaust valve closing control, advance of the ignition timing by the spark plug 6 is executed.

In general, if advancing the ignition timing, the air-fuel mixture in the combustion chamber 5 starts to be burned earlier, so the combustion energy obtained by the combustion of the air-fuel mixture can be efficiently converted to kinetic energy of the piston and, as a result, it is possible to raise the output torque of the internal combustion engine. Therefore, according to the present embodiment, when the output torque of the internal combustion engine is lower than the limit torque or is predicted as becoming lower than the limit torque, it is possible to make the ignition timing advance to supplement the output torque. Due to this, it is possible to prevent the occurrence of torque shock or stalling of the internal combustion engine.

That is, according to the present embodiment, during low load operation of the internal combustion engine, early exhaust valve closing control is used to promote deposition of fuel at the intake port and atomization of the fuel injected from the fuel injector 13 and the ignition timing is advanced under certain conditions so as to prevent the occurrence of large torque shock or stalling of the internal combustion engine. Therefore, according to the present embodiment, the combustion of the internal combustion engine is maintained as good as possible while unsuitable torque fluctuation is prevented from occurring. In particular, at the time of an idling operation of the internal combustion engine (except the time of cold start), sometimes the hydraulic pump is not enough to obtain a hydraulic pressure enough to drive the exhaust variable valve timing mechanism A. In this case, it is not possible to change the closing timing of the exhaust valve 9 and therefore not possible to prohibit early exhaust valve closing control. Therefore, in such a case, it is effective to make the ignition timing advance to suppress the occurrence of unsuitable torque fluctuation.

Note that the explanation was given with respect to the example of the case of an internal combustion engine which has an exhaust turbocharger, but the present invention is not limited to this. It can be similarly applied to an internal combustion engine which does not have an exhaust turbocharger.

Note that, the present invention was explained in detail based on specific embodiments, but a person skilled in the art could make various changes, corrections, etc. without departing from the scope of the claims and concept of the present invention.

The invention claimed is:

1. A control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens,
   wherein the control device is further provided with a torque detecting means for detecting an output torque which is output by an engine body and,
   wherein at the time of a deceleration operation of the internal combustion engine, even when the condition for executing early exhaust valve closing control stands, execution of the early exhaust valve closing control is prohibited when it is predicted that the output torque which is detected by said torque detecting means will become smaller than the limit torque.

2. A control device as set forth in claim 1, wherein during fuel cut control which stops fuel injection from the fuel injector, even when the condition for executing early exhaust valve closing control stands, the execution of said early exhaust valve closing control is prohibited regardless of the output torque and engine speed when the wall fuel deposition amount stuck to the intake port wall is smaller then a limit fuel amount.

3. A control device as set forth in claim 2, wherein said wall fuel deposition amount is estimated based on the combustion state of the preceding cycle, valve timings of the intake valve and exhaust valve, pressure inside the intake passage, amount of air passing through the intake port in the current cycle, and fuel injection amount of the current cycle.

4. A control device as set forth in claim 2, wherein, right after the end of fuel cut control, even if said condition for executing early exhaust valve closing control does not stand, said early exhaust valve closing control is executed.

5. A control device as set forth in claim 4, wherein when executing early exhaust valve closing control right after the end of fuel cut control, the amount of advance of the exhaust value in said early exhaust valve closing control is set in accordance with the wall fuel deposition amount at the time of end of said fuel cut control.

6. A control device as set forth in claim 1, wherein, during fuel cut control which stops fuel injection from the fuel injector, the amount of advance of the closing timing of the exhaust valve in said early exhaust valve closing control is controlled in accordance with the wall fuel deposition amount which is stuck to the intake port wall.

7. A control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens,
   wherein the control device is further provided with a torque detecting means for detecting an output torque which is output by an engine body and,
   wherein at the time of a deceleration operation of the internal combustion engine, even when the condition for executing early exhaust valve closing control stands, an ignition timing is advanced when it is predicted that the output torque which is detected by said torque detecting means will become smaller than a limit torque.

8. A control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens,
   wherein at the time of a deceleration operation of the internal combustion engine, even when the condition for executing early exhaust valve closing control stands, execution of the early exhaust valve closing control is prohibited when it is predicted that an engine speed will become lower than a limit speed.

9. A control device of an internal combustion engine provided with a fuel injector which injects fuel to the inside of an intake port and an exhaust variable valve timing mechanism able to change a valve timing of an exhaust valve, when conditions for executing early exhaust valve closing control stand, the control device executing early exhaust valve closing control which advances a closing timing of the exhaust valve so as to make combustion gas in a combustion chamber flow back into an intake port when an intake valve opens,
   wherein at the time of a deceleration operation of the internal combustion engine, even when the condition for executing early exhaust valve closing control stands, an ignition timing is advanced when it is predicted that the engine speed will become smaller than a limit speed.

* * * * *